United States Patent [19]

Pressaco et al.

[11] Patent Number: 4,705,147
[45] Date of Patent: Nov. 10, 1987

[54] BRAKE ACTUATOR WITH AUTOMATIC ADJUSTMENT

[75] Inventors: Pierre Pressaco, La Courneuve; Jean-Paul Sauvée, Aubervilliers, both of France

[73] Assignee: Societe Anonyme D.B.A., Paris, France

[21] Appl. No.: 30,286

[22] Filed: Mar. 23, 1987

Related U.S. Application Data

[63] Continuation of Ser. No. 661,517, Oct. 15, 1984, abandoned.

[30] Foreign Application Priority Data

Oct. 28, 1983 [FR] France ................................ 83 17300

[51] Int. Cl.⁴ ............................................. B60T 13/02
[52] U.S. Cl. ................................ 188/196 D; 188/71.9; 188/79.5 R; 188/196 M; 192/48.92
[58] Field of Search ......... 188/196B, 196 BA, 196 V, 188/196 D, 196 P, 71.9, 31 D, 79.55, 79.55 C, 79.56 C, 79.56 T, 79.56 E; 192/48.92, 48.3, 45

[56] References Cited

U.S. PATENT DOCUMENTS

| 3,068,964 | 12/1962 | Williams et al. | 188/79.5 |
|---|---|---|---|
| 3,809,189 | 5/1974 | Farr | 188/196 D X |
| 3,952,845 | 4/1976 | Asquith | 188/71.9 |
| 4,064,973 | 12/1977 | Deem et al. | 188/71.7 |
| 4,085,830 | 4/1978 | Bottoms et al. | 188/196 D |
| 4,256,206 | 3/1981 | Maehara | 188/196 D X |
| 4,351,419 | 9/1982 | Garrett et al. | 188/71.9 |
| 4,378,863 | 4/1983 | Baum | 188/71.9 |
| 4,394,890 | 7/1983 | Kleinhagen, Jr. | 188/79.5 |
| 4,499,976 | 2/1985 | Weber | 188/196 D X |

FOREIGN PATENT DOCUMENTS

| 2330949 | 1/1974 | Fed. Rep. of Germany . |
| 2644212 | 4/1977 | Fed. Rep. of Germany . |
| 2724129 | 11/1978 | Fed. Rep. of Germany . |
| 2741365 | 3/1979 | Fed. Rep. of Germany . |
| 2835305 | 2/1980 | Fed. Rep. of Germany . |
| 2150082 | 3/1973 | France . |
| 2388169 | 11/1978 | France . |
| 2063399 | 6/1981 | United Kingdom . |

Primary Examiner—George E. A. Halvosa
Assistant Examiner—Matthew C. Graham
Attorney, Agent, or Firm—Larry J. Palguta; Ken C. Decker

[57] ABSTRACT

The invention concerns a brake actuator with automatic adjustment incorporating a screw and nut actuator mechanism (32, 34) whose elongation is controlled by a screw and nut device with reversible pitch (44) and a unidirectional clutch (56) sensitive to the relative movement between the fixed body (20) and a control piston (24). The brake actuator incorporates an automatic device (68) momentarily disengaging the actuator mechanism (32, 34) when the rotational torque of the nut (32) becomes too great. The brake actuator also incorporates a manual device for resetting the automatic adjustment to zero.

16 Claims, 5 Drawing Figures

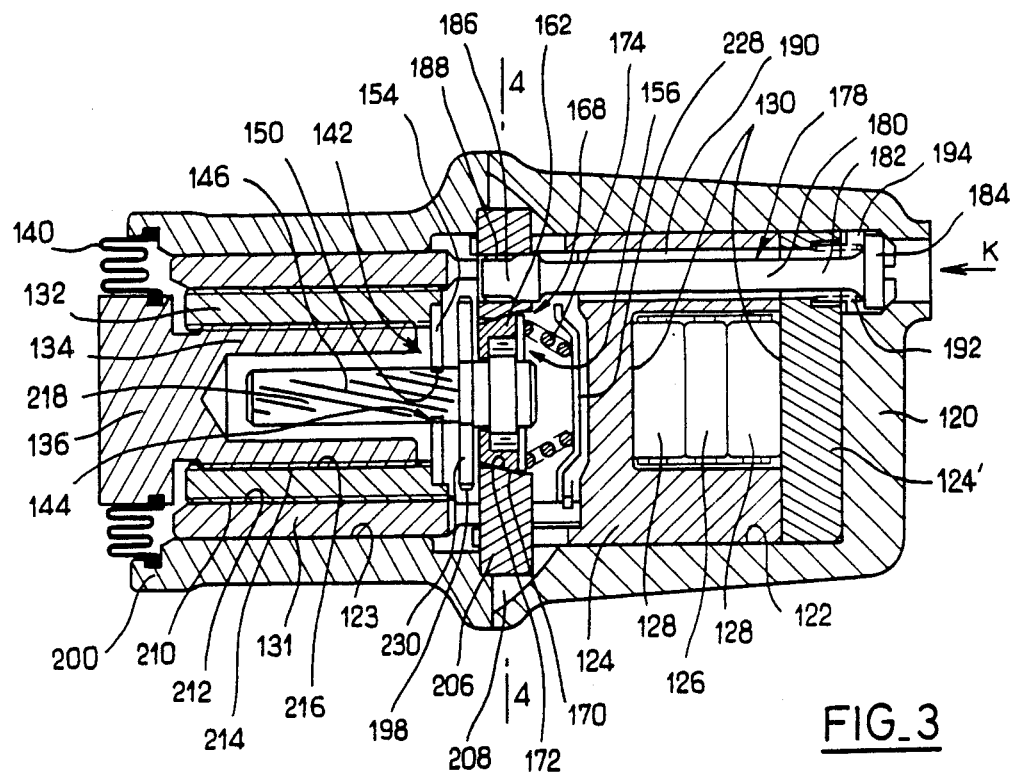
FIG_3
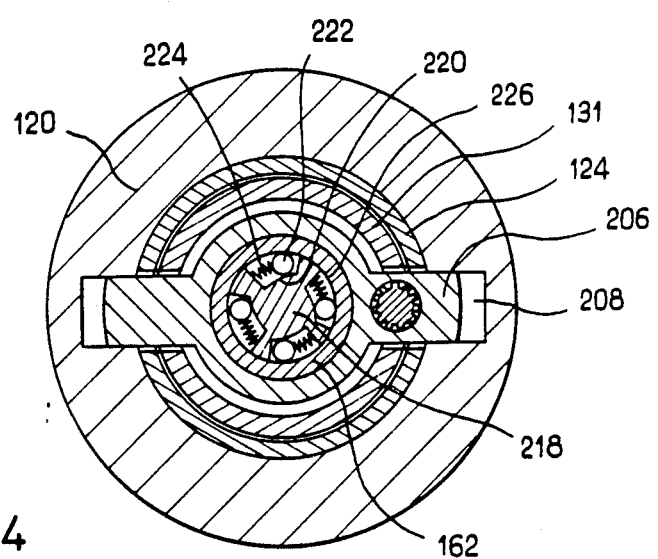
FIG_4

BRAKE ACTUATOR WITH AUTOMATIC ADJUSTMENT

This is a continuation of abandoned application Ser. No. 661,517, filed Oct. 15, 1984.

The invention concerns a brake actuator capable of operating a brake, particularly a brake intended to equip a motor vehicle.

The invention concerns in particular a brake actuator with automatic adjustment intended to compensate automatically the water of the friction linings in order to maintain the travel of the brake pedal and of the mechnical control, if the brake is so equipped, necessary for the operation of the latter, at a value which is essentially constant and small.

Numerous brake actuators are known which are equipped with a device for automatic adjustment, for example that which is described in French Patent Application published under No. 2,358,590. In this brake actuator, a movable pin is provided, capable of axially disengaging from an inclined groove if the axial force on the piston exceeds a predetermined value. This device is intended to resolve the problem of damage to the automatic adjustment if the latter is not capable of providing the adjustment, owing to an excessive axial force on the piston. Although simple, this device nevertheless has a major disadvantage, that it to say the orthogonal position of the movable pin. In fact, when the movable pin must escape from the inclined groove, it is pushed in a direction perpendicular to the direction in which it slides to escape, its guidance must be perfect and lubricated, otherwise the friction between the pin and its guide can prevent the pin escaping from the groove, and the device for automatic adjustment will be damaged by the large force to which it will be subjected by the main piston. Moreover, if the pin, having functioned correctly, owing to the amplitude of its movements, escapes from the inclined groove, the automatic adjustment ceases to operate, until the pin possibly comes to cooperate once again with the groove.

The invention proposes a brake actuator with automatic adjustment, of simple and reliable construction, not requiring any adjustment and not incorporating the disadvantages mentioned above.

With this aim, the invention proposes a brake actuator with automatic adjustment, of the type incorporating a screw and nut actuator mechanism whose elongation is controlled by a combined system of a screw and nut with reversible pitch and a unidirectional clutch sensitive to the relative axial displacement between a control piston and a fixed body housing said control piston, characterized in that said unidirectional clutch incorporates an automatic device for momentarily disengaging the actuator mechanism, controlled in enforced rotation by the unidirectional clutch when the rotational torque of said screw and nut mechansim exceeds a predetermined value.

According to another characteristic of the invention, the automatic device for momentarily disengaging the actuator mechanism incorporates two surfaces facing each other, normally pushed against one another in frictional engagement, one of these surfaces being firmly fixed to the body, the other of these surfaces being firmly fixed to said unidirectional clutch.

With such an arrangement, the assembly of the device for automatic recovery of wear is considerably simplified, its reliability being increased owing to the fact that the disengaging of the adjustment mechanism is controlled axially when the automatic adjustment has difficulty in operating owing to the force applied to the brake actuator, the risk of overadjustment especially in the case of disc brakes, being reduced.

Three embodiments of the invention are described below, by way of examples which are not limiting, with reference to the accompanying drawings, in which:

FIG. 3 is a sectional view of a brake actuator contructed in accordance with the invention according to a second embodiment and applied to the control of a disc brake;

FIG. 4 is a sectional view along the line 4—4 shown in FIG. 3;

Figure 1:
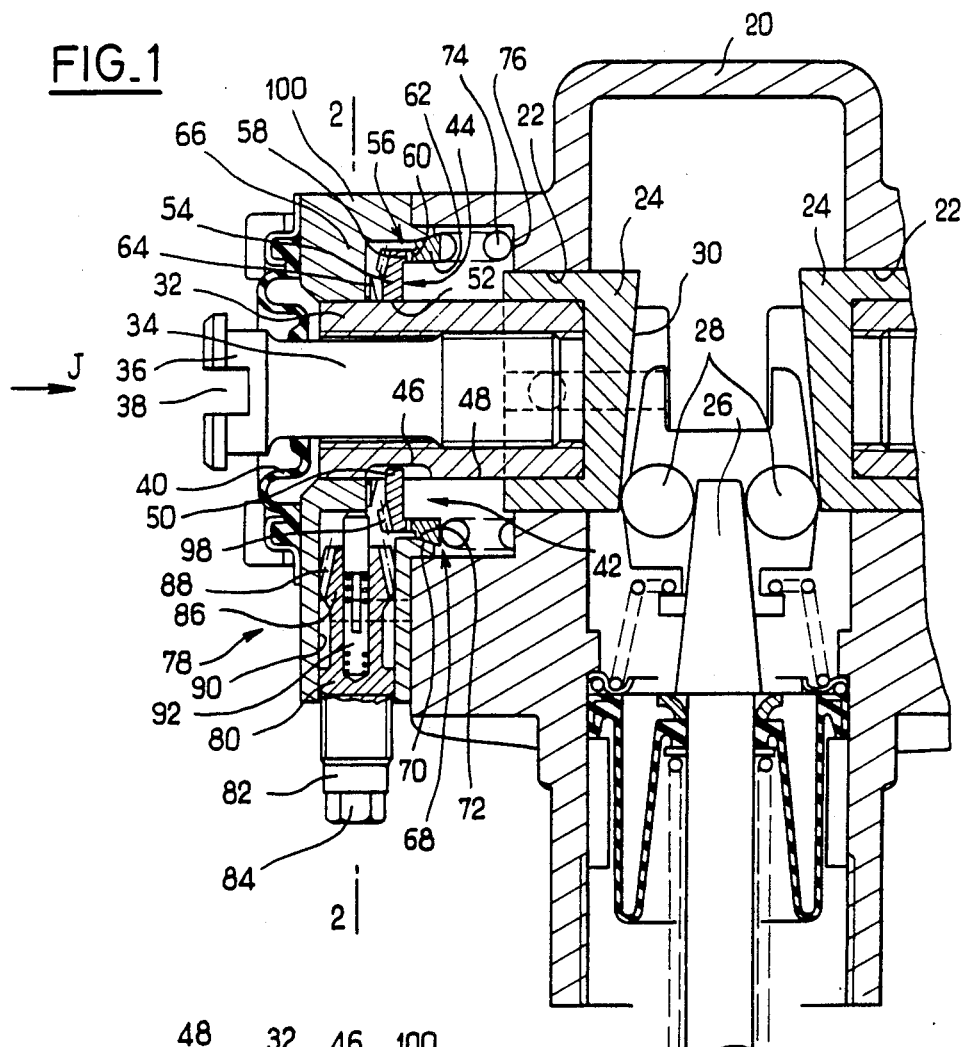
FIG. 1 is a view in partial section of a brake actuator constructed in accordance with the invention, according to a first embodiment and applied to the control of a drum brake.

The brake actuator shown in FIG. 1 is of the type with a wedge control according to an arrangement used particularly in drum brakes. This brake actuator incorporates, in a conventional manner, a body 20 incorporating two bores 22 in which pistons 24 are mounted, capable of being separated from one another by means of a wedge 26 and rollers 28 acting on the sloping bases 30 of the pistons 24 when the wedge 26 is displaced in the direction of the arrow G shown in FIG. 1. The pistons 24, by the intermediary of nuts 32 and screws 34, each pair of nut 32 and screw 34 forming a screw and nut system, are capable of separating the shoes of the drum brake (not shown) thus putting the brake into operation. In a conventional manner, the end 36 of the screw 34 incorporates a slot 38 preventing the rotation of the screw relative to the shoe during the operation of the brake. Also in a conventional manner, the end of the brake actuator is equipped with a protection device 40 positioned between the body 20 of the brake actuator and the screw 34, so as to protect the interior of the brake actuator.

In accordance with the invention, the brake actuator incorporates a device for automatic adjustment, designated as an assembly by the reference 42. In the embodiment shown in FIG. 1, it will be seen that the automatic adjustment 42 incorporates the screw and nut actuator mechanism 32, 34, controlled by a screw and nut device with reversible pitch, designated as an assembly by the reference 44. This screw and nut device with reversible pitch incorporates helical grooves 4 6formed on the periphery 48 of the nut 32, grooves into which projections 50 enter, formed on an inside diameter 52 of a control ring 54 co-operating with the body 20 through a unidirectional clutch designated as an assembly by the reference 56, and formed in the embodiment shown by two frontal assymetrical sets of teeth, one 58 carried on the control ring 54, the other 60 carried on an annular component 62 of the unidirectional clutch 56. A spring controlling the mesh 64, made in the form of an elastic ring in the embodiment shown, is positioned between the control ring 54 and a portion 66, fixed relative to the body, so as to normally press the sets of teeth 58 and 60 against one another. The brake actuator, in accordance with the invention, incorporates an automatic device for disengaging the unidirectional clutch, designated as an assembly by the reference 68. In the illustrated embodiment this device 68 incorporates two surfaces in the shape of coaxial truncated cones 70 and 72, positioned facing each other, of which one 70 is firmly fixed to the body 20, and the other 72 is firmly fixed to the unidirectional clutch through the component 62 in which it is formed. A spring 74 is positioned between said component 62 and a fixed portion 76, firmly fixed to the body 20, so as to normally press the two surfaces in the shape of truncated cones 70 and 72 against one another.

According to another characteristic of the invention, the brake actuator incorporates a device for resetting to zero, designated as an assembly by the reference 78. The device for resetting to zero 78 is formed by a rod 80 incorporating at one end 82 an operating head 84, made in the form of a hexagonal screw head in the embodiment shown, and incorporating at its other end 86 a set of teeth 88. The rod 80 is positioned in a bore 90 formed in the body 20, in which the rod is capable of being axially displaced in the direction of the arrow H shown in FIG. 2, against a return device with a spring 92 formed, in the embodiment shown, by a spring and a plunger bearing against the body 20. The rod 80 incorporates a groove 94 which co-operates with a dowel 96 so as to limit the axial movements of the rod 80. The control ring 54 carries a second frontal set of teeth 98, capable of co-operating with the teeth 88 of the device for resetting to zero 78, when the rod 80 is displaced in the direction of the arrow H shown in FIG. 2.

Figure 2:
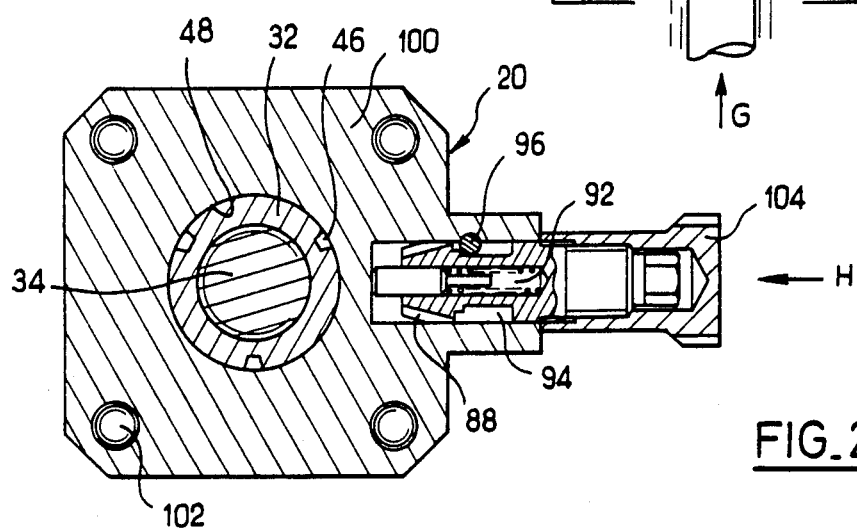
FIG. 2 is a section along the line 2—2 shown in FIG. 1.

As may be seen in FIGS. 1 and 2, the body 20 incorporates a removable portion 100, fixed to the body 20 by means of four screws 102, this removable portion 100 incorporating the bore 90 intended to accept the device for resetting to zero 78, and on which is directly formed the surface in the shape of a truncated cone 70, firmly fixed to the fixed body. Also, this removable portion 100 defines the preload of the spring 74 which pushes the two surfaces in shape of truncated cones into frictional engagement against one another.

The brake, which is described above with the aid of FIGS. 1 and 2, operate in the following manner: when the brake actuator is to be operated, a thrust is exerted on the wedge 26 in the direction of the arrow G shown in FIG. 1. Under the effect of this thrust, the wedge enters between the two rollers 28 which roll, firstly on the wedge 26, and secondly on the bases 30 of the pistons 24, and as the wedge and the bases 30 are inclined, the pistons 24 are separated from one another so as to push the brake shoes (not shown). The movement of the piston 24 shown on the left-hand side of FIG. 1 is thus towards the left at the moment when the brake is operated. This movement of the piston 24 causes movement of both nut 32 and and screw 34, the nut 32 bearing against the piston 24. The movement of the nut 32 and, more precisley, the movement of the helical grooves 46 carried on the periphery 48 of this nut, causes rotation of the control ring 54, the frontal asymmetrical sets of teeth 58, 60 of the unidirection clutch 56 allowing the ring 54 to turn relative to the component 62 by compressing the spring controlling the mesh 64. If the movement of the piston 24 is of an amplitude such that there is no offsetting of the two frontal sets of teeth 58 and 60, then on releasing the brake the latter regain their initial positions. However, if the amplitude of the movement of the pistons 24 is such that the helical grooves 46 cause a rotation of the control ring 54 so that the latter jumps one or more teeth relative to the component 62, then on the return stroke, as the control ring 54 cannot turn owing to the asymmetrical sets of teeth of the unidirectional clutch 56, the projections 50 of the control ring impose a rotational movement on the nut 32 through the helical grooves 46. As the screw 34 is immobilized in rotation by the slot 38 which co-operates with the shoes, the rotation of the nut 32 causes the elongation of the screw and nut mechanism 32–34, thus compensating for the wear of the friction linings carried by the shoes. However, if the rotation of the nut 32 is prevented by a significant axial force on the screw 34 due, for example, to a sudden change in the direction of braking (as in the case of stopping on a slope), then the control ring 54 is pushed in rotation and axially in the direction of the arrow J by the nut 32, the ring 54 co-operating with the component 62 pushes the latter in forced rotation against the normal frictional engagement, generated by the spring 74, of the two surfaces in the shape of truncated cones 70 and 72, allowing simultaneous rotation of the control ring 54 and of the component 62, and this without any risk of damaging either the unidirectional clutch, or the screw and nut device with reversible pitch, formed in the embodiment shown by the projections 50 of the control ring 54, forming the nut, and the helical grooves 46 of the nut 32 which, forming the screw of the screw and nut device. When the force on the screw 34 ceases, as the control ring and the component 62 have turned relative to the body 20, the device is again ready to carry out an adjustment during a subsequent operation. The device has stored no energy during this operation.

It may thus be seen that the greater the force applied to the screw 34 in the direction of the arrow J, the greater becomes the force available to put the unidirectional clutch out of action; in particular, this force, opposed to the force of the spring 74, lessens the friction between the two surfaces in the shape of truncated cones, which assists their relative rotation.

When the automatic adjustment is to be reset to zero, for example during changes of the friction linings, it is advantageous to be able to carry out this resetting to zero before the drum is removed, as generally the edge of the drum is less worn than the central portion of the rubbing area, and the removal of the drum may prove difficult or even impossible if a partial or total return towards a retracted position cannot be carried out on the automatic adjustment system. Owing to the construction of the control ring, and to the possibility of forming a second set of teeth 98 on this ring, the device for resetting to zero 78 can project through the support of the brake actuator in such a way that access is possible before removing the drum. To carry out a total or even partial resetting to zero of the automatic adjustment, the following procedure is carried out: having removed a protective cap 104, if fitted, as shown in FIG. 2, the rod 80 is pushed against the spring 92, which allows the teeth 88 and 98 to mesh with one another. With a suitable spanner, the operating head 84 is turned which pushes in rotation, through the teeth 88 and 98, the control ring 54. As this ring cannot rotate freely owing to the unidirectional clutch 56, a force must be applied to the head 84 so as to force the surfaces in the shape of truncated cones 70 and 72 to relative to one another; when this frictional force is overcome, the control ring 54, by rotating, drives the rotation of the nut 32, which allows the screw 34 inside the nut 32 to be screwed back, and consequently makes it possible to reduce the length of the system for automatic adjustment. On releasing the thrust force on the end 82 of the rod 80, owing to the spring 92, the rod 80 returns to the rest position, as shown in FIG. 2, bearing against the dowel 96. The removal of the brake drum, if necessary, can then be carried out without difficulty.

FIGS. 3 and 4 show a second embodiment applied to a brake actuator for a disc brake. In this brake actuator, operation is achieved by means of a wedge 126 pushing apart two inclined surfaces 130 through rollers 138. One of the surfaces 130 is formed on a piece 124' firmly fixed to the bottom of the body 120, the other being formed at the end of a piston 124 sliding in a bore 122 formed in the body 120. The piston 124, by the intermediary of an extension 131 of a nut 132 and of a screw 134, terminated by a plunger 136, is capable of displacing an adjacent friction component to operate the disc brake. The extension 131, the nut 132 and the screw 134 with its plunger 136, form the screw and nut mechanism. The plunger 136 is immobilized in a known manner (not shown) to prevent its rotation relative to the friction component during operation of the brake actuator. Also in a known manner, the brake actuator is protected at its end adjacent to the plunger 136 by a protection device 140. Referring to FIG. 3, it may be seen that the body 120 carries a second bore 123 in which the extension 131 of the piston 124 slides. The extension 131 bears against the piston 124, the extension 131 and the piston 124 being immobilized in rotation by means of two slots, into which a component 206 enters, fixed relative to the body. As may be seen more particularly in FIG. 4, this fixed component 206 is immobilized in rotation relative to the body by means of a milled slot 208 into which two extensions of the component 206 enter. Referring to FIG. 3, it may be seen that the extension 131 incorporates an internal thread 210 into which the nut 132 is screwed, by means of an external thread 212. The nut 132 also has an internal thread 214 which co-operates with an external thread 216 formed on the screw 134. In accordance with the invention, the brake actuator incorporates a device for automatic adjustment designated as an assembly by the reference 142. Referring to FIG. 3, it may be seen that the screw and nut mechanism 132, 134 is controlled by a screw and nut device with reversible pitch, designated as an assembly by the reference 144. This device 144 is formed by a screw 218 which incorporates, on its periphery, helical grooves 146 into which enter the projections 150 formed on an internal diameter of a working ring 154, firmly fixed to the nut 132. The screw 218 and the working ring 154 form the device with reversible pitch. The screw 218 is linked to the body 120 through a unidirectional clutch, designated as an assembly by the reference 156. Referring to FIGS. 3 and 4, it may be seen that the unidirectional clutch is constructed here by means of ramp surfaces 220 formed on the screw 218 and jamming rollers 222 pushed by springs 224 into jamming engagement between the ramps 220 internally and externally a cylindrical surface 226 formed internally on an annular component 162 of the unidirectional clutch 156 surrounding the screw 218. Referring to FIG. 4, it may be seen that if the screw 218 is pushed in rotation in an anti-clockwise direction, the rollers 222 jam between the ramp surface 220 and the cylindrical surface 226 and firmly fix together the two components 218 and 162. In a clockwise direction, the rollers disengage against the springs 224 and permit relative rotation of the screw 218 and the component 162. In accordance with the invention, the brake actuator incorporates an automatic device 168 for disengaging the unidirectional clutch 156. As may be seen in FIG. 3, the device 168 incorporates two coaxial surfaces in the shape of truncated cones 170 and 172, positioned facing each other, one 170 being firmly fixed to the body 120 through the component 206, the other 172 being firmly fixed to the component 162 of the unidirectional clutch, on which this surface in the shape of a truncated cone is formed. A spring 174, positioned between the component 162 and a cup 228 firmly fixed to the extension 131, by means of a circlip, for example, normally pushes the two surfaces in the shape of truncated cones 170 and 172 into frictional engagement with one another.

According to another characteristic of the invention, the brake actuator incorporates a device for resetting to zero 178 the automatic adjustment 142. This device 178 is formed by a rod 180, one end 182 of which incorporates an operating head 184, formed in the embodiment shown by a screw head which can be operated by a screw driver. The other end 186 of the rod 180 incorporates a set of teeth 188. The rod 180 is positiond in a hole 190 formed in the piston 124 and also in the component 206. The rod 180 is capable of being displaced in the direction of the arrow K as shown in FIG. 3 against a return spring 192. The head 184 of the rod 108 is positioned in a recess 194 formed in the body 120 which limits the axial travel of the rod 180. The screw 218 carries an annular component 230 on which is formed a set of radial teeth 198 capable of co-operating with the teeth 188 of the rod 180 when the latter is displaced in the direction K as shown in FIG. 3. As may be seen in FIG. 3, the body 120 incorporates a removable portion 200 fixed to the body 120, for example by screwed connections, which enables the component 206 to be enclosed and immobilized between the two portions of the body 120, thereby also enclosing the device for resetting to zero and the piston 124.

The brake described above with the aid of FIGS. 3 and 4 operates in the following manner; when operation of the brake actuator is desired, the wedge 126 is inserted between the rollers 128. The movement of the wedge causes the separation of these rollers 128 which exert a thrust on the piston 124 towards the left in FIG. 3. The piston 124, by the intermediary of its extension 131 also pushes the nut 132 to the left through the screwed connection 210, 212 The nut 132, through the screwed connection 214, 216 pushes the screw 134 and hence the plunger 136, which itself acts upon the friction component (not shown) to cause a frictional engagement between the said component and a disc to be braked. If the movement in translation of the nut 132 to the left is of small amplitude, the projections 150 of the ring 154 do not push the helical grooves 146 of the screw 218, owing to the play existing between the said projections and the said grooves. If the amplitude of the movement of the nut 132 becomes greater, the working ring 154 causes rotation of the screw 218 owing to the helical grooves 146, the screw 218 being free to turn in this direction owing to the unidirection clutch 156. On releasing the braking, the unidirectional clutch 156 preventing rotation of the screw 218, the working ring 164 causes rotation of the nut 132, after recovering the play, and causes the automatic adjustment to take place, that is to say the elongation of the screw and nut mechanism 132–134. In the same way as for the preceding embodiment, the brake actuator is equipped with an automatic device 168 for momentarily disengaging the unidirectional clutch 156 if the rotation force of the nut 132 exceeds a predetermined value. If the nut 132 offers a force resisting rotation, the working ring 154 pushes the screw 218 in rotation and axially towards the right in FIG. 3. These forces being exerted against friction and against the spring 174 allow forced rotation relative to one another of the two surfaces in the shape of truncated cones 170 and 172, thus allowing rotation of the screw 218 and momentarily disengaging the unidirectional clutch 156. When these forces are reduced, the friction engagement between the two surfaces in the shape of truncated cones increases again, and the working ring 154 can cause the nut 132 to turn, thus causing a partial adjustment of the brake.

This characteristic is very important in the case of a disc brake, in which the movements of the pistons can be broken down in three parts, the first corresponding to the approach of the pads to the disc, the second corresponding possibly to the recovery of wear of these pads and, lastly, the third corresponding to the distortion of the brake caliper owing to the very large thrust exerted on the latter. The assurance of sufficient retraction of the piston after the release of the brake so as to avoid overadjustement is provided by the play between the projections 150 of the working ring 154 and the helical grooves 146 of the screw 218, this provided that the brake has not previously been adjusted. In order to avoid possible overadjustment, due to the distortion of the caliper, as previously explained, the spring 174 is calibrated so that the adjustment cannot occur as long as the caliper exerts on the plunger 136 a force of restitution of its distortion. When the caliper is no longer under stress, then the automatic adjustment occurs to remove the possible wear of the friction components. It may thus be seen that, owing to the construction of the unidirectional clutch associated with a device for disengaging the latter, overadjustments due to mechanical distortion of the brake cannot occur.

In the same way as for the first embodiment, the brake actuator shown in FIGS. 3 and 4 incorporates a device 178 for resetting the automatic adjustment 142 to zero. To carry out a resetting to zero, a screwdriver is introduced into the slot in the head 184, and this screwdriver and the head are pushed in the direction of the arrow K against the spring 192. This displacement of the head and the rod 180 causes the teeth 188 carried by the rod 180 to mesh with the teeth 198 carried by the annular component 230. By turning the screwdriver, and hence the rod 180, the screw 218 is forced to turn, against the friction between the two surfaces in the shape of turncated cones 170 and 172. Rotation of the screw 218 causes rotation of the nut 132 and consequently, causes displacement towards the right of the screw 134 and the plunger 136, thus effecting a total or partial return of the automatic adjustment to a retracted position. On releasing the screwdriver, the spring 192 disengages the rod 180 and, more particularly, the teeth 188 from the teeth 198, and holds the device for resetting to zero in an inoperative retracted position.

The mounting of the spring 174 previously described, that is to say bearing, firstly against the cup 228 firmly fixed to the piston 124 through the extension 131, and secondly against the fixed component 206 through the unidirectional clutch and the surfaces in the shape of truncated cones 170 and 172, ensures the return to the right of the piston 124 and of the extension 131 when the operation of the brake actuator has ceased, thus allowing, at rest, a clearance between pad and disc.

Figure 5:
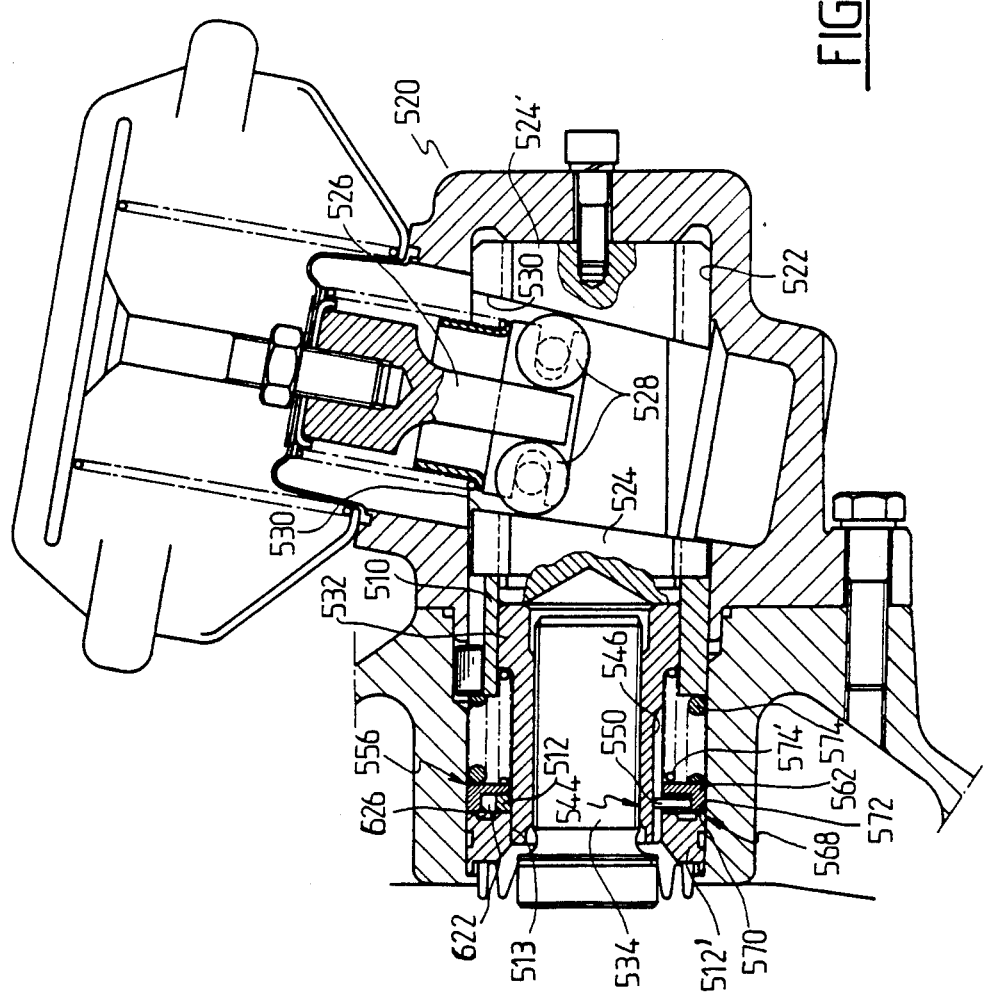
FIG. 5 is a sectional view of a brake actuator constructed in accordance with the invention according to a third embodiment and also applied to the control of a disc brake.

FIG. 5 shows a third embodiment also applied to a brake actuator for a disc brake. As in the embodiment of FIGS. 3 and 4, a wedge 526 and its two rollers 528 engage two inclined surfaces 530 formed, respectively, on a part 524' firmly fixed to the bottom of the body 520 and on the end of a piston 524 sliding in a bore 522 formed in the body 520 and received in a groove of a sleeve forming a cage 510. The piston 524 cooperates in pushing engagement with a screw 534 and nut 532 mechanism to operate an adjacent friction component (not shown) according to a fitting similar to the one described in relation to FIGS. 1 and 2, the piston 524 engaging directly to push the tubular nut 532 received to slide in the end of the sleeve 510 opposed to the part 524'. The piston 524 incorporates, on its periplery at least one helical groove 546 into which enters a pin or a projection 550 formed on the internal diameter of an annular part 512 surrounding the nut 532 and forming with the latter the screw and nut device with reversible pitch, designated as an assembly by the reference 544. The annular part 512 is linked to the body 520 through an unidirectional clutch, designated as an assembly by the reference 556 and constructed as in the embodiment according to FIGS. 3 and 4 by jamming rollers 622 located between ramp surfaces formed on the periphery of the annular part 512 and an internal cylindrical surface 626 formed on an annular component 562 having a cross-section in the form of an L, surrounding the nut 532, and in which is received the annular part 512. The assembly of parts 512 and 562 is kept pressed together by two coaxial compressed springs 574 and 574' against an annular bearing piece 512' fitted in the body 520 and which incorporates a central bore 513 in which is slidably received the end of the tubular nut 532 opposed to the piston 524. The internal axial face of the bearing piece 512' forms frictional bearing surface 570 for the corresponding axial face 572 of the component 562 forming by that way with the springs 574 and 574' an escapement device 568 or an automatic device for disengaging the unidirectional clutch 556. The external spring 574, having a higher stiffness, is disposed between the radially external part of the component 562 and the adjacent end of the sleeve 510 thereby pushing the latter axially against the bottom of the body 520, the internal spring, having a lower stiffness, being disposed between the radially internal part of the component 562 and a shoulder of the tubular nut 532 thereby pushng the latter axially against the piston 524.

The operation of the device according to FIG. 5 is similar to those described in relation to the two previous embodiment. Under the action of the springs 574 and 574', the component 562 forming an external bearing surface for the unidirectional clutch 556, is normally maintained stationary, If however during the adjustment phase, the torque required for the rotation of the nut 532 is too high, due to an axial force exerted on the screw 534, a forced rotation appears, against the springs 574 and 574', relative to one another of the two surfaces 570 and 572, thereby allowing a simultaneous rotation of the parts 512 and 562 neutralizing the fuction of the unidirectional clutch 556. As in the previous embodiments, the brake actuator may incorporate a device for resetting the automatic adjustment to zero (not shown) incorporating a head capable of meshing with teeth carried on the front face of the piece 512 when actuated externally.

It may be seen, in the light of the foregoing description of different embodiments, that the device is simple, and therefore of increased reliability, without risk of damage owing to large forces stored during braking operations, and that its construction lends itself most particularly to the use of devices for resetting to zero which are always accessible, even if the friction components, shoes for the first embodiment and brake pads for the second and third embodiment, ar themselves not accessible owing to the presence of the drum or, for example, the wheel.

It is very clear that the embodiments described do not limit the invention, and that modifications may be carried out without departing from the framework of the present invention.

We claim:

1. A brake actuator with an automatic slack adjuster incorporating a screw and nut actuator mechanism whose elongation is controlled by the combination of a control device having a screw and nut with reversible pitch and a unidirectional clutch sensitive to relative axial displacement between a control piston and a fixed body housing said control piston, characterized in that said unidirectional clutch effects rotational operation of said automatic slack adjuster and incorporates an automatic device for momentarily disengaging the automatic slack adjuster when rotational torque of said screw and nut actuator mechanism exceeds a predetermiend value, said automatic device for disengaging the automatic slack adjuster including two surfaces facing each other and normally pushed against one another in frictional engagement, one of the surfaces being fixed firmly to the body and the other surface being fixed firmly to said unidirectional clutch, at least one spring pushing said two surfaces into engagement against one another to effect the frictional engagement which defines said predetermined value beyond which the two surfaces are capable of rotational movement relative to one another, said spring being a first compression spring pushing a component of the unidirectional clutch, the component carrying said other surface, and the combination including a control ring having on an internal diameter at least one projection entering into a helical groove formed peripherally on the nut of the screw and nut actuator mechanism to provide the control device having a screw and nut with reversible pitch.

2. The brake actuator according to claim 1, characterized in that the unidirectional clutch includes a set of frontal asymmetrical teeth cooperating with a set of frontal asymmetrical teeth carried by said component of the unidirectional clutch.

3. The brake actuator according to claim 2, characterized in that a compression spring is positioned between a portion of the fixed body and the control ring and pushes continually the two sets of teeth toward one another.

4. The brake actuator according to claim 2, characterized in that the screw and nut actuator mechanism, the control device, the two surfaces, the sets of teeth, the piston, and the springs are coaxially aligned.

5. A brake actuator with an automatic slack adjuster incorporating a screw and nut actuator mechanism whose elongation is controlled by the combination of a control device having a screw and nut with reversible pitch and a unidirectional clutch sensitive to relative axial displacement between a control piston and a fixed body housing said control piston, characterized in that said unidirectional clutch effects rotational operation of said automatic slack adjuster and incorporates an automatic deivce for momentarily disengaging the automatic slack adjuster when rotational torque of said screw and nut actuator mechanism exceeds a predetermined value, said automatic device for disengaging the automatic slack adjuster including two surfaces facing each other and normally pushed against one another in frictional engagement, one of the surfaces being fixed firmly to the body and the other surface being fixed firmly to said unidirectional clutch, at least one spring pushing said two surfaces into engagement against one another to effect the frictional engagement which defines said predetermined value beyond which the two surfaces are capable of rotational movement relative to one another, and the brake actuator including a reset device for resetting to zero the screw and nut actuator mechanism, the reset device effecting rotation of the nut of the screw and nut actuator mechanism and against frictional resistance defined by frictional engagement of the two surfaces.

6. The brake actuator according to claim 5, characterized in that said spring is a first compression spring pushing a component of the unidirectional clutch, the component carrying said other surface.

7. The brake actuator according to claim 6, characterized in that said spring against a portion fixed relative to said body.

8. The brake actuator according to claim 6, characterized in that said surfaces are coaxial and shaped like truncated cones.

9. The brake actuator according to claim 5, characterized in that said reset device incorporates a rod provided at one end with an operating head and at the other end with a set of teeth capable of being displaced against a return spring and engaged with another set of teeth, said another set of teeth cooperating with the nut of the screw and nut actuator mechanism.

10. The brake actuator according to claim 9, characterized in that said another set of teeth is carried by a control ring forming part of said combination.

11. The brake actuator according to claim 10, characterized in that an axis of the rod is perpendicular to an axis of said piston.

12. The brake actuator according to claim 9, characterized in that said another set of teeth is carried by an annular component firmly fixed to the screw of the control device.

13. The brake actuator according to claim 12, characterized in that an axis of the rod is parallel to an axis of said piston.

14. A brake actuator with an automatic slack adjuster incorporating a screw and nut actuator mechanism whose elongation is controlled by the combination of a control device having a screw and nut with reversible pitch and a unidirectional clutch sensitive to relative axial displacement between a control piston and a fixed body housing said control piston, characterized in that said unidirectional clutch effects rotational operation of said automatic slack adjuster and incorporates an automatic device for momentarily disengaging the automatic slack adjuster when rotational torque of said screw and nut actuator mechanism exceeds a predetermined value, said automatic device for disengaging the automatic slack adjuster including two surfaces facing each other and normally pushed agianst one another in frictional engagement, one of the surfaces being fixed firmly to the body and the other surface being fixed firmly to said unidirectional clutch, at least one spring pushing said two surfaces into engagement against one another to effect the frictional engagement which defines said predetermined value beyond which the two surfaces are capable of rotational movement relative to one another, said spring being a first compression spring pushing a component of the unidirectional clutch, the component carrying said other surface, the unidirectional clutch including ramp surfaces for jamming rollers and formed on a part of the control device, and springs pushing the rollers into jamming engagement between said ramps and a cylindrical portion firmly fixed to said component of the unidirectional clutch.

15. The brake actuator according to claim 14, characterized in that said first compression spring bears against a cup firmly fixed to said piston.

16. The brake actuator according to claim 14, characterized in that the nut of the screw and nut actuator mechanism has an internal thread cooperating with a screw formed on a plunger and an external thread cooperating with an internal thread formed on a component fixed firmly to said piston, the nut of the screw and nut actuator mechanism also including a working ring fixed firmly thereto and having projections on an inside diameter which enter into helical gooves formed on the screw of the control device, said working ring forming said nut of the control device.

* * * * *